Feb. 9, 1937.     B. A. WOINA     2,070,502
VEHICLE WINDOW
Filed Dec. 19, 1932     2 Sheets-Sheet 1

Benjamin A. Woina.
INVENTOR

BY Stanley Lightfoot
ATTORNEY

Feb. 9, 1937. B. A. WOINA 2,070,502
VEHICLE WINDOW
Filed Dec. 19, 1932 2 Sheets-Sheet 2

Benjamin A. Woina
INVENTOR

BY Stanley Lightfoot
ATTORNEY

Patented Feb. 9, 1937

2,070,502

UNITED STATES PATENT OFFICE 2,070,502

VEHICLE WINDOW

Benjamin A. Woina, Detroit, Mich.

Application December 19, 1932, Serial No. 647,865

4 Claims. (Cl. 296—44)

This invention relates to the windows of vehicles, more particularly of automobiles, buses, railroad coaches and similar passenger-carrying vehicles, wherein provision for ventilation without draft is desired; and it is an object of this invention to provide such a window which will include these advantages together with a further advantage of readily opening and closing of the rear part of the window in a manner admitting of a rapid operation to permit signalling, for instance, as by the extension of the arm from the vehicle such as is customary in the present practice of driving automobiles.

A further object is to provide a glass "wing", or windbreaker, in combination with the window proper and so shrouded above and below that the tendency of air currents to converge around the said wing to a point in the vicinity of the rear part of the window is averted and draft so avoided when the said rear part of the window is opened. Anent this feature it is pointed out that combinations of an unshrouded wing with a window have been heretofore suggested and used but such a wing has resulted in the centering of an air current about the rear portion of the window which current would enter the vehicle with a resultant draft should such rear portion of the window be opened. Furthermore, with an unshrouded wing, especially if set at any considerable angle to the plane of the window, rain in many occasions could enter the vehicle even through the forward part of the window when this was open.

A further object of the invention is to provide in combination with an angularly disposed wing or wind-breaker a window having a horizontally slidable glass affording by its position an opening forwardly or rearwardly thereof, or both forwardly and rearwardly thereof; a further object being to provide if desired a further glass also horizontally and independently slidable to effect with the first-mentioned glass the complete closure of the window opening when the said glasses are moved to their limits in opposite directions.

The invention further contemplates the provision for vertical movement of one or other or both, together or independently, of the said glasses to provide partial or complete vertical opening of the window when desired.

Still further objects and advantages subsidiary or incidental to the aforesaid objects or resulting from the construction or operation of the invention as it may be carried into effect, will become apparent as the said invention is hereinafter further disclosed.

In carrying the said invention into effect, I may provide in combination with the window opening of a vehicle a wing or wind-breaker extending at an angle outwardly from the front of said opening, said wing being shrouded at the top and bottom and the shrouds extensible as in a fan-like manner where adjustment of the wing is desired, a vertically split window in said opening comprising two glasses capable of independent horizontal movement in the window opening, and means for effecting the vertical raising and lowering of said glasses.

All of which is more particularly described and ascertained hereinafter, by way of example, having reference to the accompanying drawings, wherein.

Figure 1:
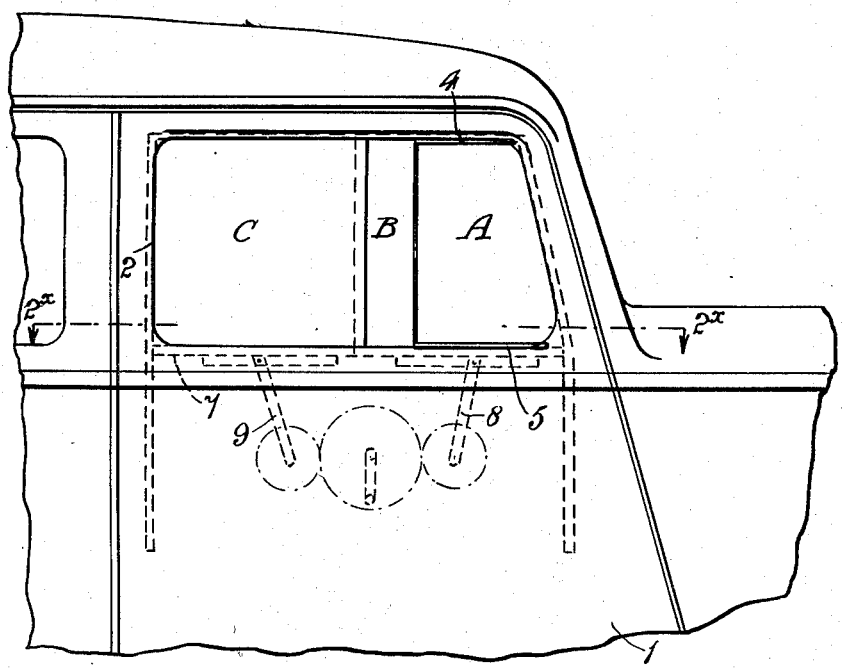
Figure 1 is a fragmentary elevation showing the forward window of an automobile embodying the said invention.
Figure 2:
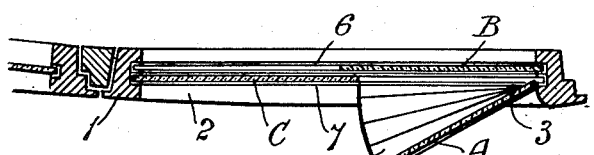
Figure 2 is a detail section of the same taken on the line 2×—2× of Figure 1.

Referring first to Figures 1 and 2, I is an automobile door panel having the usual window opening 2 and provided with an angularly disposed glass wing or wind-breaker extending outwardly from the forward limit of the said opening in the manner common with such wings, which have long been well known in this art. These wings may be, and preferably are pivoted in the usual manner as about the point 3 for angular adjustment, and in this case is shown as provided with shrouds 4 and 5 at the upper and lower extremities of the wing closing the angular opening at the top and bottom thereof as will be readily understood. Where the wing is adjustable as to angularity, these shrouds may be of a fan-like structure, as shown in Figure 2, to permit their extension or collapsing to conform to the adjustment of the wing. The object of these shrouds is primarily to prevent the converging of air currents passing around the upper and lower edges of the wing to a point within the confines of the rear part of the window opening although the upper shroud also serves to prevent the entrance of rain or snow between the said wing and the forward part of the window opening, so that the window may be opened as a whole and still be adequately protected against the incursion of objectionable air currents such as would otherwise result.

The window proper is shown as being split vertically, or substantially so and comprising two panes or glasses B and C which normally form a complete closure for the window opening in which the wing A is not contributary, the said wing A operating merely as a draft excluder when one or other of the glasses B or C is in an open or partially open position.

The said glasses B and C are horizontally slidable in suitable frames 6 and 7 so that by the horizontal sliding of one or other, or of both, of the said glasses B and C the window of the vehicle may be opened forwardly or rearwardly or both forwardly and rearwardly. The forward opening of the said window permits excellent draftless ventilation due to the presence of the wing with protection against the incursion of rain due to the presence of the upper shrouding of the wing, whilst the rear opening of the window is not accompanied by the usual draft-producing air current which the ordinary unshrouded wing produces so that this opening is attended by much less discomfort than is generally experienced permitting further ventilation, great freedom for signalling or other purposes where it is desired to project an arm or any object through the window opening, and the forward sliding of the rear glass C admits of rapid operation so that it may be effected with a minimum of trouble in cases of emergency as when an operator wishes to signal the making of a turn, for instance, or throw matches or other objects out of the window.

Lifting mechanisms 8 and 9 of any suitable type may be provided for raising and lowering the frames 6 and 7 independently or together so that when desired one glass may remain in position while the other is lowered out of position relative to the window opening, or both glasses may be lowered leaving the opening entirely clear except for the presence of the wing A.

Figure 4:
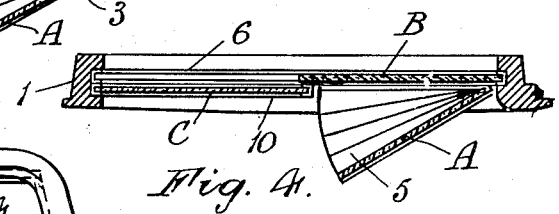
Figure 4 is a detail section taken on the line 4×—4× of Figure 3.
Figure 3:
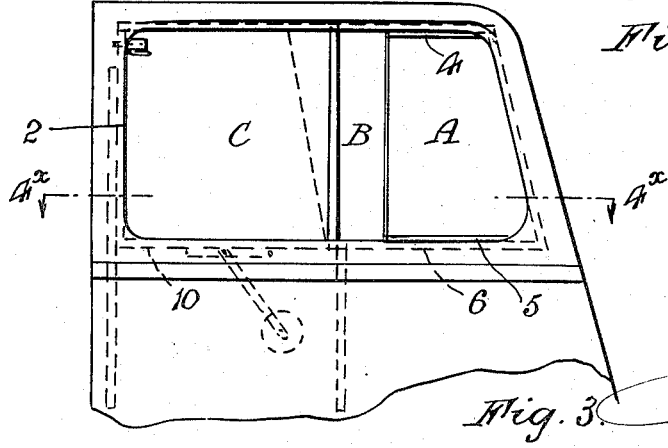
Figure 3 is a fragmentary elevation of the vehicle door panel illustrating a modified form of the invention applied thereto.

In the modified arrangement Figures 3 and 4 only the glass B is horizontally slidable the glass C being carried by vertically movable frame 10 and not horizontally slidable, being merely dependent upon its vertical movement for opening and closing although it will be readily apparent that this relationship may be reversed the glass B being restricted to vertical movement and the glass C capable of horizontal movement. The horizontal movable glass may also, of course, be capable of vertical adjustment in the manner already described with reference to Figure 1.

Figure 5:
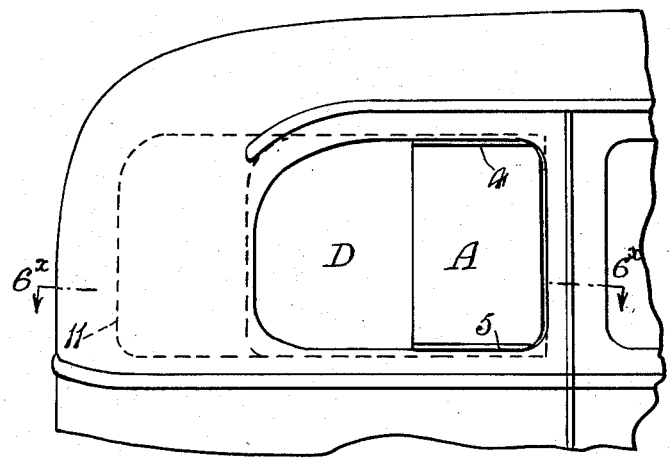
Figure 5 is a fragmentary elevation showing the rear quarter window opening of an automobile with a simple form of the invention applied thereto.
Figure 6:
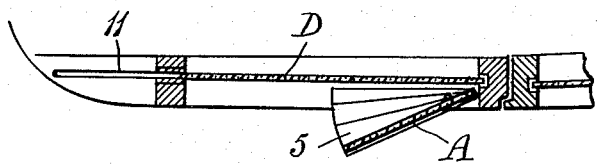
Figure 6 is a detail section of the same taken on the line 6×—6× of Figure 5.
Figure 7:
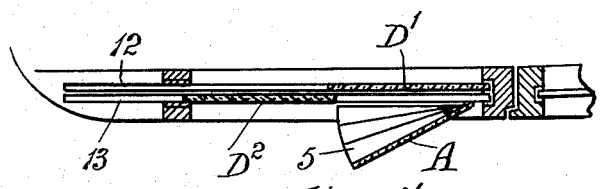
Figure 7 is a similar view to Figure 6 illustrating a further modification of this arrangement.

Having reference to Figures 5 and 6 showing suitable arrangement for the rear quarter window of an automobile it is pointed out that this window in a car is not usually capable of full vertical movement and may be only partially opened so that with the present arrangement the vertical movement is dispensed with and the window opening is shown as being provided with a single glass D horizontally and partially slidable into a recess 11 in the rear quarter of the body structure, the wing cooperating in providing for draft and rain exclusion when the window is opened and the adjustment of the glass D determining the width of slot or window opening desired by the rider to suit the purposes of ventilation.

Where more complete opening of the window is desired, the arrangement shown in Figure 7 may very conveniently be adopted wherein the window is again vertically split and comprises glasses $D^1$ and $D^2$ slidable into recesses 12 and 13 in the rear quarter body structure; and in this arrangement the ability to open the window forwardly or rearwardly or both forwardly and rearwardly is gained with the advantages already stated.

Detailed illustration of the hardware such as window lifters, locks, hinges, and similar fittings has been considered unnecessary as such fittings are well known and standard in this art and their operation well understood and it will be obvious that any desirable means may be employed for moving or facilitating the movement for securing the movement of the windows or wings as expedience or desirability may direct.

This invention may be developed within the scope of the following claims without departing from the essential features of the said invention; and that it is desired that the specification and drawings be read as being merely illustrative and not in a limiting sense except as necessitated by the prior art.

What I claim is:

1. In combination with a vehicle body having a window opening, a pair of glasses forming the complete closure of said opening, means guiding said glasses for horizontal sliding movement, and means for raising and lowering each of said glasses independently.

2. In combination with a vehicle body having a window opening, a pair of superimposed frames in said opening, a slidable glass in each of said frames, and means for vertically moving one of said frames independently of the other.

3. In combination with a vehicle body having a window opening, a pair of superimposed frames in said opening, a slidable glass in each of said frames, and means for raising and lowering each of said frames independently of the other.

4. In a vehicle body having a window opening in one side thereof, a pair of juxtapositioned frames in said opening, a panel slidably mounted in each of said frames, means for vertically moving one of the frames independent of the other, and a pivoted panel supported in the window opening at the outer side of one of the panels for swinging movement about an up and down axis.

BENJAMIN A. WOINA.